(12) United States Patent
McKeon

(10) Patent No.: US 8,276,851 B2
(45) Date of Patent: Oct. 2, 2012

(54) CONTROL OF AERODYNAMIC FORCES BY VARIABLE WETTED SURFACE MORPHOLOGY

(75) Inventor: Beverley J. McKeon, Tujunga, CA (US)

(73) Assignee: California Institute of Technology, Pasadena, CA (US)

( * ) Notice: Subject to any disclaimer, the term of this patent is extended or adjusted under 35 U.S.C. 154(b) by 1190 days.

(21) Appl. No.: 12/117,959

(22) Filed: May 9, 2008

(65) Prior Publication Data

US 2009/0001222 A1 Jan. 1, 2009

Related U.S. Application Data

(60) Provisional application No. 60/928,737, filed on May 10, 2007.

(51) Int. Cl.
*B64C 21/10* (2006.01)

(52) U.S. Cl. ........................ 244/204; 244/130; 296/181.5

(58) Field of Classification Search .................. 244/200, 244/204, 130, 205; 296/181.5
See application file for complete search history.

(56) References Cited

U.S. PATENT DOCUMENTS

| | | | |
|---|---|---|---|
| 4,516,747 A | 5/1985 | Lurz | |
| 5,803,409 A * | 9/1998 | Keefe | 244/206 |
| 5,961,080 A | 10/1999 | Sinha | |
| 6,267,331 B1 * | 7/2001 | Wygnanski et al. | 244/204 |
| 6,833,656 B2 * | 12/2004 | Hooley et al. | 310/369 |
| 6,892,989 B1 * | 5/2005 | Whitmore et al. | 244/200 |
| 6,935,242 B2 * | 8/2005 | Rastegar et al. | 102/501 |
| 6,982,402 B1 * | 1/2006 | Rastegar et al. | 244/3.1 |
| 7,059,664 B2 * | 6/2006 | Aase et al. | 296/180.5 |
| 7,147,269 B2 * | 12/2006 | Aase et al. | 296/180.1 |
| 7,147,271 B2 * | 12/2006 | Aase et al. | 296/180.5 |
| 7,178,395 B2 * | 2/2007 | Browne et al. | 73/170.11 |
| 7,178,859 B2 * | 2/2007 | Browne et al. | 296/180.5 |
| 7,255,044 B2 * | 8/2007 | Rastegar et al. | 102/400 |
| 7,429,074 B2 * | 9/2008 | Mc Knight et al. | 296/180.1 |
| 7,516,918 B2 * | 4/2009 | Cox et al. | 244/53 R |
| 7,703,839 B2 * | 4/2010 | McKnight et al. | 296/180.5 |
| 7,798,443 B2 * | 9/2010 | Hamilton et al. | 244/99.8 |
| 7,901,524 B1 * | 3/2011 | McKnight et al. | 148/563 |
| 8,113,469 B2 * | 2/2012 | Lang | 244/200 |
| 2001/0020666 A1 * | 9/2001 | Wygnanski et al. | 244/204 |
| 2003/0047645 A1 * | 3/2003 | Rastegar et al. | 244/3.24 |
| 2005/0115443 A1 * | 6/2005 | Rastegar et al. | 102/400 |
| 2005/0133668 A1 * | 6/2005 | Rastegar et al. | 244/130 |

(Continued)

FOREIGN PATENT DOCUMENTS

DE 3913678 C1 * 7/1990

(Continued)

*Primary Examiner* — Benjamin P Lee
(74) *Attorney, Agent, or Firm* — Milstein Zhang & Wu LLC; Joseph B. Milstein

(57) ABSTRACT

Systems and methods for providing dynamic control to a vehicle in a dynamic fluid. The systems and methods of the invention relate to one or more morphable surfaces that can be controlled by a controller and an actuator in an active manner to provide asperities that interact with a fluid moving across the morphable surfaces. By controlling the size, shape and location of the asperities, one can exert control authority over the motion of the vehicle relative to the fluid, including a speed, a direction and an attitude of the vehicle. Examples of materials that provide suitable morphable surfaces include ionic polymer metal composites and shape memory polymers, both of which types of material are commercially available. Useful morphable surface systems have been examined and are described.

27 Claims, 8 Drawing Sheets

U.S. PATENT DOCUMENTS

| | | | |
|---|---|---|---|
| 2006/0000942 A1* | 1/2006 | Rastegar et al. | 244/3.1 |
| 2006/0207465 A1* | 9/2006 | Rastegar et al. | 102/501 |
| 2007/0063099 A1* | 3/2007 | Holloman, Jr. | 244/117 R |
| 2008/0087762 A1* | 4/2008 | Holloman et al. | 244/30 |
| 2009/0047197 A1* | 2/2009 | Browne et al. | 422/307 |
| 2009/0065650 A1* | 3/2009 | McKeon et al. | 244/204 |
| 2009/0200417 A1* | 8/2009 | Mitchell | 244/30 |
| 2011/0042524 A1* | 2/2011 | Hemmelgarn et al. | 244/203 |
| 2011/0254107 A1* | 10/2011 | Bulovic et al. | 257/415 |

FOREIGN PATENT DOCUMENTS

| | | | |
|---|---|---|---|
| GB | 2223821 A | * | 4/1990 |
| WO | WO 03106260 A1 | * | 12/2003 |
| WO | WO 2006/040532 A1 | | 4/2006 |

* cited by examiner a). POSITIVE b). NO c). NEGATIVE

CONTROL OF AERODYNAMIC FORCES BY VARIABLE WETTED SURFACE MORPHOLOGY

CROSS-REFERENCE TO RELATED APPLICATIONS

This application claims priority to and the benefit of co-pending U.S. provisional patent application Ser. No. 60/928,737, filed May 10, 2007, which application is incorporated herein by reference in its entirety. This application is related to co-pending U.S. patent application Ser. No. 12/106,638, filed Apr. 21, 2008, which application is incorporated herein by reference in its entirety.

STATEMENT REGARDING FEDERALLY FUNDED RESEARCH OR DEVELOPMENT

This invention was made with government support under Grant No. FA9550-08-1-0049 awarded by the Air Force (AFOSR). The government has certain rights in the invention.

FIELD OF THE INVENTION

The invention relates to aerodynamic applications in general and particularly to control of aerodynamic forces in applications that employ morphing surfaces.

BACKGROUND OF THE INVENTION

Various methods and systems have been used to attempt to control boundary layer flow in aerodynamic systems. These include passive methods for boundary layer control including static roughness, passive, compliant surfaces, and active methods such as flaps, rudders and ailerons. In particular, several research initiatives have sought to utilize morphing concepts for flow control purposes. The most notable large-scale agency-sponsored efforts include the DARPA Micro Adaptive Flow Control (MAFC) program and micro-aero adaptive control in the NASA Morphing project, both of which have exploited smart structures and advanced discrete MEMs actuator concepts that require low actuation energy to target control of large-scale aerodynamic flows and multi-point adaptability in aircraft operations.

There is a rich technical literature that describes laminar flow, turbulent flow, transitions between the two flow regimes, and the interaction of flow regimes with various surface conditions, such as surface roughness.

Classical results for turbulent boundary layers, such as Townsend's hypothesis that the outer-scaling layer is not affected by the roughness other than through the friction velocity, and the logarithmic scaling of the mean velocity with the effective roughness amplitude, $\delta$, as the scaling lengthscale, hold only when k is small compared to the boundary layer thickness, $\delta$, i.e., $k/\delta \ll 1$, which is not always satisfied in lower Reynolds number experiments. The latter scaling also only holds when the flow has reached equilibrium.

In laminar flows, roughness is known to enhance linear receptivity to external disturbances, leading to increases in the disturbance growth rates and reductions in the critical Reynolds number for transition to turbulence.

In practical airfoil flows, under certain conditions in-flight wing icing may lead to the generation of a temporary static roughness distribution, with detrimental, or at least unplanned, implications for the aerodynamic performance of the vehicle.

Previous patents in the field of flow control include U.S. Pat. No. 4,516,747, issued May 14, 1985 to Lurz entitled "Method and apparatus for controlling the boundary layer flow over the surface of a body," U.S. Pat. No. 5,961,080 issued Oct. 5, 1999 to Sinha, entitled "System for efficient control of flow separation using a driven flexible wall," and an International Application published under the PCT as International Publication No. WO 2006/040532 A1, published Apr. 20, 2006, in the names of Morrison, J. F., Dearing S. S., Arthur, G. G., M$^c$Keon, B. J and Cui, Z., entitled "Intelligent Fluid Flow Surfaces." U.S. Pat. No. 4,516,747 describes a system for boundary layer control by damping of laminar instability or turbulent velocity fluctuations using sensors and vibration transmitters. U.S. Pat. No. 5,961,080 describes a flexible wall that can be used either to drive or sense an external flow by means of sub-surface capacitive transducers. International Publication No. WO 2006/040532 A1 describes distributed "active", or time-dependent, dimples fabricated from electrostrictive polymer with surface-deposited electrodes. In particular, International Publication No. WO 2006/040532 A1 teaches that the use of dimples is "much more effective than surface roughness." International Publication No. WO 2006/040532 A1 describes designs and manufacturing methods that are specifically intended to achieve a deflection of a continuous sheet to provide depressions or dimples in the continuous sheet in preference to protrusions.

A number of problems in applying previous flow control methods and systems have been observed. One drawback to using passive devices for flow control lies in degraded aerodynamic performance in flow regimes away from those where the control is useful. Some drawbacks in using some active devices can be the complexity of a control system, and the need for expendables such as gases or liquids that are consumed, which add weight, and which limit the duration of operation of the system by virtue of being available in only a finite amount.

There is a need for improved aerodynamic control surface systems and methods.

SUMMARY OF THE INVENTION

In one aspect, the invention relates to a vehicle configured to operate using a morphable skin to manipulate viscous boundary layer processes. The vehicle comprises a vehicle having a surface; a morphable skin having first and second surfaces, the first surface of the morphable skin being attached to at least a portion of the surface of the vehicle, the second surface of the morphable skin configured to exhibit a morphable configuration relative to the surface of the vehicle; an actuator in operative communication with the morphable skin, the actuator configured to apply a control signal to the morphable skin; and a controller in communication with the actuator, the controller configured to provide a command to the actuator to control at least one of a speed, a direction and an attitude, the command based at least in part on a deviation of a perceived speed, direction or attitude from a desired speed, direction or attitude. In response to a command signal provided to the actuator, the actuator controls the second surface of the skin so that the skin assumes a modified surface configuration relative to the surface of the vehicle so as to control an aerodynamic force to exert a control authority over at least one of the speed, the direction and the attitude of the vehicle.

In one embodiment, the morphable skin comprises an ionic polymer metal composite. In one embodiment, the vehicle further comprises electrodes in electrical communication with the morphable skin. In one embodiment, the control signal is an electrical signal applied to the electrodes.

In one embodiment, the morphable skin comprises a shape memory material. In one embodiment, the controller is an input/output device configured to be operated by a human operator. In one embodiment, the controller is a general purpose programmable computer configured to operate with commands provided by software recorded on a machine-readable medium. In one embodiment, the modified surface configuration relative to the surface of the vehicle comprises a surface asperity of the order of 1 millimeter. In one embodiment, the modified surface configuration relative to the surface of the vehicle comprises a surface asperity having a height of the order of 10 percent or less than a boundary layer thickness of a fluid passing over the apparatus. In one embodiment, the modified surface configuration relative to the surface of the vehicle comprises a surface asperity having a height represented by the relation $m^*v/u_\tau$, in which $v$ is a fluid kinematic viscosity, $u_\tau$ is a friction velocity equal to a square root of a ratio of wall shear stress $r$ to a fluid density $\rho$, and $0 \leq m \leq 100$. In one embodiment, the modified surface configuration relative to the surface of the vehicle has a response frequency of the order of 1 kiloHertz. In one embodiment, the modified surface configuration relative to the surface of the vehicle has a response frequency of less than the order of the viscous frequency, given by $u_\tau^2/v$, in which $v$ is a fluid kinematic viscosity, and $u_\tau$ is a friction velocity equal to a square root of a ratio of wall shear stress $\tau$ to a fluid density $\rho$.

In another aspect, the invention features a method of operating a vehicle. The method comprises the steps of: providing a vehicle having a surface; providing a morphable skin having first and second surfaces, the first surface of the morphable skin attached to at least a portion of the surface of the vehicle, the second surface of the morphable skin configured to exhibit a morphable configuration relative to the surface of the vehicle; providing an actuator in operative communication with the morphable skin, the actuator configured to apply a control signal to the morphable skin; providing a controller in communication with the actuator, the controller configured to provide a command to the actuator to control at least one of a speed, a direction and an attitude, the command based at least in part on a deviation of a perceived speed, direction or attitude from a desired speed, direction or attitude; and applying a control signal to the morphable skin from the actuator. In response to the control signal, the second surface of the morphable skin is caused to assume a modified surface configuration relative to the surface of the vehicle to exert a control authority over at least one of the speed, the direction and the attitude of the vehicle.

In one embodiment, the morphable skin comprises an ionic polymer metal composite. In one embodiment, the method of operating a vehicle further comprises the step of providing electrodes in electrical communication with the morphable skin. In one embodiment, the control signal is an electrical signal applied to the electrodes.

In one embodiment, the morphable skin comprises a shape memory material. In one embodiment, the controller comprises an input/output device configured to be operated by a human operator. In one embodiment, the controller is a general purpose programmable computer configured to operate with commands provided by software recorded on a machine-readable medium. In one embodiment, the modified surface configuration relative to the surface of the vehicle comprises a surface asperity of the order of 1 millimeter. In one embodiment, the modified surface configuration relative to the surface of the vehicle comprises a surface asperity having a height of the order of 10 percent or less than a boundary layer thickness of a fluid passing over the apparatus. In one embodiment, the modified surface configuration relative to the surface of the vehicle comprises a surface asperity having a height represented by the relation $m^*v/u_\tau$, in which $v$ is a fluid kinematic viscosity, $u_\tau$ is a friction velocity equal to a square root of a ratio of wall shear stress $\tau$ to a fluid density $\rho$, and $0<m \leq 100$. In one embodiment, the modified surface configuration relative to the surface of the vehicle is attained in a time of the order of 1 millisecond. In one embodiment, the modified surface configuration relative to the surface of the vehicle has a response frequency of less than the order of the viscous frequency, given by $u_\tau^2/v$, in which $v$ is a fluid kinematic viscosity, and $u_\tau$ is a friction velocity equal to a square root of a ratio of wall shear stress $\tau$ to a fluid density $\rho$.

The foregoing and other objects, aspects, features, and advantages of the invention will become more apparent from the following description and from the claims.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

DETAILED DESCRIPTION OF THE INVENTION

Figure 1:
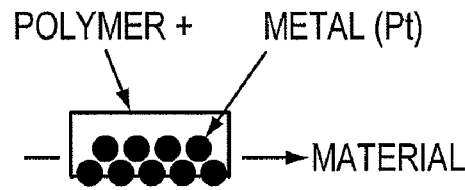
FIG. 1 is a diagram that illustrates the basic principle of strain generation in an ionic polymer metal composite (IPMC) under an electric field of positive, negligible and negative sign.
Figure 1:
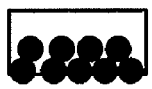
Figure 1:

This application describes the use of controlled changes to the global morphology of surfaces below external or internal flows to manipulate viscous boundary layer processes. In describing the invention, reference will be made to a vehicle. It is to be understood that the invention can apply equally to a vehicle moving in a fluid, and to a fluid flowing over one or more surfaces of an object such as a vehicle or to a fluid flowing through a duct. What is of importance is the relative motion of the vehicle and the fluid in which the vehicle is immersed, and it is of little consequence whether the vehicle is moving, the fluid is moving or both are moving, so long as the relative motion of the vehicle and the fluid are the same in whichever frame of reference is applied. As used hereinafter, the term "vehicle" will denote any of an object capable of motion through a fluid, such as a car, a boat, or a plane; an object that is not movable but that can be subjected to forces created by the motion of a fluid around or past the object (such as a building or a bridge subjected to wind loading); and an object such as a duct or an orifice through which fluid can flow and which is subjected to forces (and equally subjects the fluid to forces) as a consequence of the relative motion of the fluid and the object.

The viscous boundary layers can be laminar or turbulent. The controlled morphological changes allow one to gain control authority over the magnitude, direction and distribution of aerodynamic forces. The controlled morphological changes can include either or both of global changes in the roughness of a surface that interacts with a fluid, and local geometrical changes of the surface that interacts with a fluid, such as dynamically creating local surface distortions. It is believed that this technology will provide a new method for exerting control authority to replace or augment traditional control surfaces.

The boundary layer processes in question include, for example, both enhancement and suppression of steady and unsteady laminar and turbulent flow separation, flow transition, turbulent mixing leading to elevated skin friction with respect to the laminar case and transonic flows. That is, flow conditions that are receptive to small perturbation, either by earlier design of the flow or by identification of appropriate locations in the flow.

It is believed that the required morphological changes can be obtained by harnessing mechanical properties including buckling instabilities, phase changes, magnetic and electronic characteristics of materials such as electroactive polymers, thin film-substrate composites and shape memory polymers and alloys. Both step changes, or "on-off roughness", and time-dependent amplitude disturbances are envisioned, where the frequency of actuation in the latter case depends on the physics of the particular flow to be controlled.

It is anticipated that the required maximum deformation parameters in water or air as measured under laboratory conditions will be of the order of 1 mm for the peak roughness amplitude, with peak frequency requirements of the order of 1 kHz, based on conditions for a fully-rough wall operating at the burst frequency of an undisturbed turbulent boundary layer. These magnitudes will likely be smaller for application where the fluid flow is more rapid, such as in flight applications.

This bulk boundary condition approach avoids discrete actuator-flow interactions, with the associated difficulty in modeling. The control surface may be flexible and a non-structural or structural part of an aero- or hydro-dynamic vehicle or device. As used herein, the term "aerodynamic" will be understood to refer generally to vehicle or vehicles that operate according to either aerodynamic or hydrodynamic principles, unless a statement so construed is illogical. Drive electronics for materials that require activation may form an integrated part of the surface. Power requirements will be small due to the extremely small actuation amplitudes required.

This method of the generation of aerodynamic control belongs to a class with minimum required power because the characteristics of the fluid flow are used to obtain a large amplification of the input disturbance. As such, it is anticipated that the technology can be used in a feedback control loop with a controller that is automated, e.g., one that uses a computer operating with commands provided by software recorded on a machine-readable medium in order to obtain specific control objectives related to optimized vehicle flight or motion, such as controlling at least one of a speed, a direction and an attitude (e.g., one or more of pitch, tilt, and yaw). The computer receives signals from sensors that report information about the perceived speed, direction and attitude of the vehicle, and computes commands calculated to correct the speed, direction and/or attitude to provide a desired speed, direction and attitude. In other situations, the controller can be a human operator, who provides control commands by operating a control input/output device such as one or more of a joystick, a pointing device, a heads-up display, a keyboard, or other conventional input/output device that allows the human operator to perceive at least one of a speed, a direction and an attitude and to issue corrective commands when the perceived speed, direction or attitude differs from a desired speed, direction or attitude.

As an example, the control authority that can be obtained from the appropriate use of surface perturbations could be used in order to permit operator-directed control of the flight characteristics of a vehicle, for example attitude, lift or drag. It is envisioned that this method of control could be used either to augment or ultimately replace traditional control surfaces such as ailerons, elevators, rudder, and flaps. Benefits of this technology are expected to include one or more of reduced weight associated with the control device, reduced power requirement, and an altered signature. While these applications may be enumerated here, other similar applications are anticipated.

Initial laboratory studies of the control authority that can be generated using a change in the surface roughness boundary condition of an airfoil are described.

The present disclosure describes systems and methods to create materials capable of dynamic changes in surface morphology. In one embodiment, the changes in surface morphology specifically comprise systems and methods designed to create asperities in a continuous surface. As used herein, the term "asperity" is meant to denote a slight projection from a surface, such as a point or bump. See *The American Heritage® Dictionary of the English Language, Fourth Edition*, Houghton Mifflin Company, 2004. In particular, by applying the principles of the invention one can modify the geometry and especially the amplitude of an asperity on a morphable free surface. In one embodiment, by modifying the size, shape and location of such asperities, the hydrodynamic roughness characteristics of the surface when placed in a fluid flow can be tailored to fluid dynamic advantage. In other embodiments, a local geometrical feature of a surface can be dynamically controlled, for example by changing the local geometry so as to provide a local geometrical disturbance such as a single asperity at a selected location and having a selected size and shape. These systems and methods are expected to provide such advantages as the control of laminar and turbulent flow separation, control of flow transition, reduction of turbulent skin friction, and a new method for exerting control authority (e.g., replacing traditional control surfaces).

It is expected that these "dynamic surfaces" can be fabricated from ionic polymer metal composite, an electro-active polymer commonly used in artificial muscle applications, when such a material is constrained on one side. In this arrangement, the material would permit the generation of both binary, "on-off" roughness, and time-periodic roughness geometries. Binary roughness is an operational regime in which a surface remains smooth until wall roughness is aerodynamically beneficial, e.g. as a trip to induce transition to turbulence, to increase local skin friction in turbulent flow, or to otherwise improve aerodynamic performance. Time-periodic roughness geometries provide a regime in which one can inject additional length- and time-scales at the wall boundary. It is believed that vorticity flux arising from dynamically rough surfaces with optimized properties and variation parameters can be used to manipulate the near-wall turbulence cycle in turbulent boundary layers with a view to manipulating local shear stress, providing such advantages as enhancement for separation control, reduction for skin friction control and asymmetry for augmentation or replacement of traditional control surfaces.

In keeping with the principles of the invention, the surfaces are expected to be tailored to be as rough as possible while maintaining hydrodynamic smoothness in the unactuated state for given flow conditions. Under an applied electric potential, the material comprising the free surface will morph to enhance the local surface amplitude, creating hydrodynamic roughness of time-dependent amplitude. It is anticipated that the required maximum deformation parameters for systems operating in water or air, under conditions found in typical low—to mid-Reynolds number laboratory experiments, will be of the order of 1 mm for the peak roughness amplitude, with peak frequency requirements of the order of 1 kHz, based on conditions for a fully-rough wall operating at the burst frequency of an undisturbed turbulent boundary layer. These magnitudes are expected to be smaller for in flight applications.

This bulk boundary condition approach avoids discrete actuator-flow interactions, with the associated difficulty in modeling. It is expected that the systems and methods of the invention will provide the ability to control both static roughness interactions with the flow, which represents the zero frequency limit of a dynamic roughness, and transient and/or time-periodic effects.

Based on results that have been obtained and that are described hereinbelow, it is expected that the systems and methods of the invention will provide the ability to generate dynamic roughness on a flexible surface that can form either a non-structural or a structural part of an aero- or hydrodynamic vehicle or device. In some embodiments, drive electronics form an integrated part of the surface. This approach is possible because of recent advances in active materials. Materials that are believed to be suitable for this application are Ionic Polymer Metal Composites (IPMC), which is one class of an Electro-Active Polymer (EAP). An IPMC can be bought off-the-shelf, for example from Environmental Robots, Inc. (E.R.I.) of 909 Virginia Nebr., Suite 205, Albuquerque, N. Mex. 87108.

Ionic Polymer Metal Composite (IPMC)

IPMC is comprised of a sandwich of an ionomeric perfluorinated Polymer Ion Exchange Membrane (PIEM) such as Nafion® 117, available from DuPont, between surface depositions of a conducting, catalytic material such as platinum that also provides metal electrodes embedded or attached on both sides. In a fully-hydrated configuration, the material has a pore and channel morphology that can be tailored to be permeable to cations but impermeable to anions.

The Nafion® polymer is comprised of a hydrophobic fluorocarbon backbone, fixed hydrophilic $SO_3^-$ anions, and mobile hydrophilic $H^+$ cations. This material has been found to be compatible with water, and when immersed in an aqueous solution it will swell until equilibrium is reached. Nafion® membranes are used in PEM fuel cells.

FIG. 1 is a diagram that illustrates the basic principle of strain generation in IPMC under an electric field of positive, negligible and negative sign. The schematic also represents the method of dynamic roughness actuation in a constrained configuration. When an electric potential is applied to a material (or to a liquid) in which both anions and cations are free to move, the oppositely charged ions travel in opposite directions resulting in no net momentum.

Under an applied electric field E, the resultant electroosmotic pressure gradient $-\nabla p$ is governed by the following equations:

$$J = \sigma E - L_{12} \nabla p \qquad (1)$$

$$Q = L_{21} E - K \nabla p \qquad (2)$$

where J is the current density of the ion transport perpendicular to the electrodes, σ is the membrane conductance, $L_{12} = L_{21} \sim 10^{-8}$ ms$^{-1}$/Vm$^{-1}$, Q is the water flux and K is the Darcy permeability of the membrane. The migration of both cations and electrophoretic solvent (free water) to the electrode (cathode) induces a large bending stress toward the anode as shown in FIG. 2.

Figure 2:
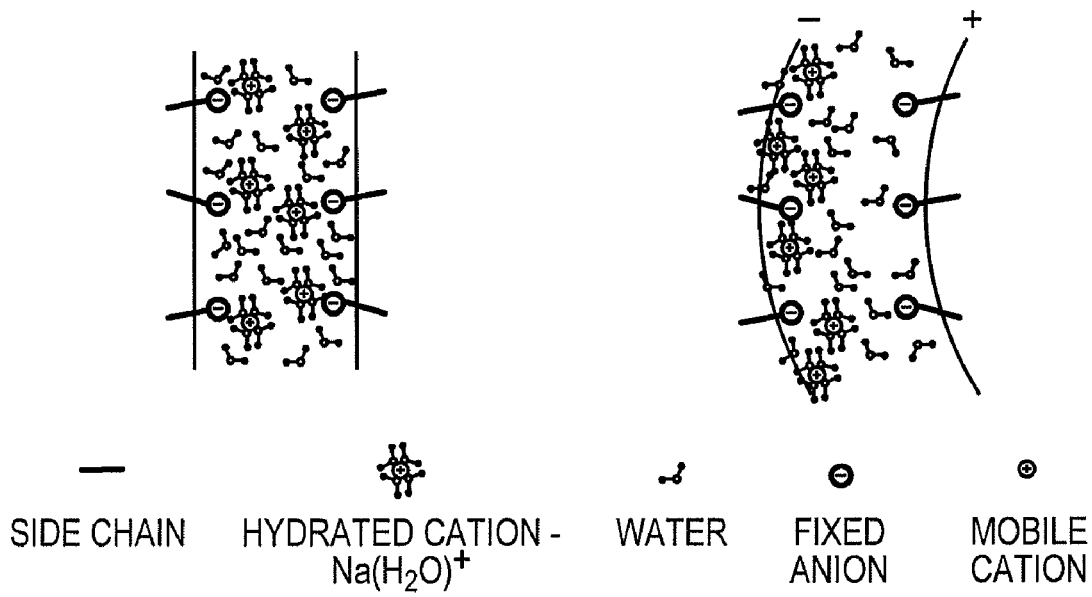
FIG. 2 is a diagram that illustrates the IPMC actuation in cantilevered configuration, demonstrating bending towards the anode, for a cation exchange membrane.

FIG. 2 is a diagram that illustrates the IPMC actuation in cantilevered configuration, demonstrating bending towards the anode, for a cation exchange membrane. In an IPMC only the cations are allowed to move since the anion structures are fixed by being attached to the Nafion® polymer backbone. As a result, when a voltage is applied, the hydrophilic cations as well as attracted water molecules migrate towards the cathode (through channels in the hydrophobic backbone structure). This electro-osmotic process results in a concentration of water at the cathode which causes it to expand, while the anode side contracts. A net bending motion towards the anode side is observed. In FIG. 2, a deactivated (unbent) sample of an IPMC is schematically shown on the left, and an activated sample is schematically shown on the right.

It has been found that a voltage between 1-3V is sufficient to cause a bending motion in an IPMC. However, the amplitude of deflection is largely dependent on the applied voltage and higher voltages (>5V) are necessary to achieve maximum deflection. At these higher voltages, water molecules begin to break down and electrolysis occurs. This is an undesirable side-effect since the activation process depends heavily on the transport of water molecules.

It has been observed for some IPMC materials that when a DC voltage is applied for an extended period of time (for example, more than 30 s), the IPMC tends to relax back towards the cathode side rather than holding a constant deflection. This is thought to be the result of an increasing water concentration gradient towards the cathode side, eventually resulting in diffusion of water back towards the anode. Improvements in IPMC materials may in the future eliminate this behavior.

Prior to this, to the best knowledge of the inventors, IPMC has not been exploited in the boundary layer control arena. It is extensively used as artificial muscle due to the large available bending deformations that can be obtained in a cantilever configuration at low imposed voltages and at low frequencies, of the order of 1 Hz, a frequency significantly lower than those required for boundary layer control applications.

It is expected that one can employ IPMC in an innovative configuration in which the material is constrained along one surface of a sheet, leading to local, elastic deformation of the free or unconstrained surface of the exposed electrode in the presence of a time-varying electric field. Such surface modification of a sheet of IPMC is expected to enhance the existing surface roughness in a pattern determined by the particular membrane and electrode properties. IPMC is expected to be an excellent candidate material for this type of time-periodic roughness.

The mechanism for strain generation in IPMC is the migration of ions across the PIEM membrane. When one side of the IPMC is constrained, for example by attachment with epoxy to a rigid (or substantially rigid) substrate, and is subjected to time-varying electrical stimuli, the corresponding frequency response observed far exceeds the typical responses observed in artificial muscle applications, in which maximum frequencies of the order of 0.1 Hz are observed because of the large deflections that are required. It is expected that responses of the order of 10 kHz can be observed under controlled conditions, which frequency exceeds the burst frequency by at least an order of magnitude or approaches the burst frequency.

The magnitude of the electroosmotic pressure (and hence the surface deformations) will also be frequency dependent, according to the number of ions that can migrate through the PIEM during each half cycle of an applied electrical signal, with peak amplitudes of the order of 1 mm expected at low input frequency. It is expected based on work using IPMC in cantilevered configuration, that one should be able to measure the response of the material to pressure fluctuations in the flow of ions, with the possibility that one may be able to extract pressure information from the voltage response of the unactuated material.

In specific embodiments, the electrode on at least one of the sides of the IPMC can be configured to have a plurality of individually addressable segments, so that the electric field applied in a first location of the IPMC can be controlled without regard to the field that is applied in another location of the IPMC. Using such individually addressable electrode segments, the IPMC can be controlled to provide distributed roughness in one area, and to create geometrical changes to the shape of the material in another area. It is believed that the control signals required to cause local geometrical disturbances will be larger in magnitude and lower in frequency that the signals required to cause a change in the distributed roughness over an area of a surface. In principle, there can be applied a superposition of signals, so that a selected area of the IPMC can be made to exhibit any of no change from an initial condition of roughness and shape, a change of shape alone, a change of roughness alone, or a change in both the geometrical shape and the surface roughness simultaneously.

Dynamic roughness is an extremely promising application of IPMC. It is expected that the roughness amplitude can be maximized by one or all of the following methods: using larger ions for the PIEM, e.g., sodium ion rather than the smaller lithium ion; and by applying a suitable surface treatment to the exposed electrode to increase the unactuated roughness amplitude while keeping it hydrodynamically smooth, for example by sandblasting.

Figure 3:
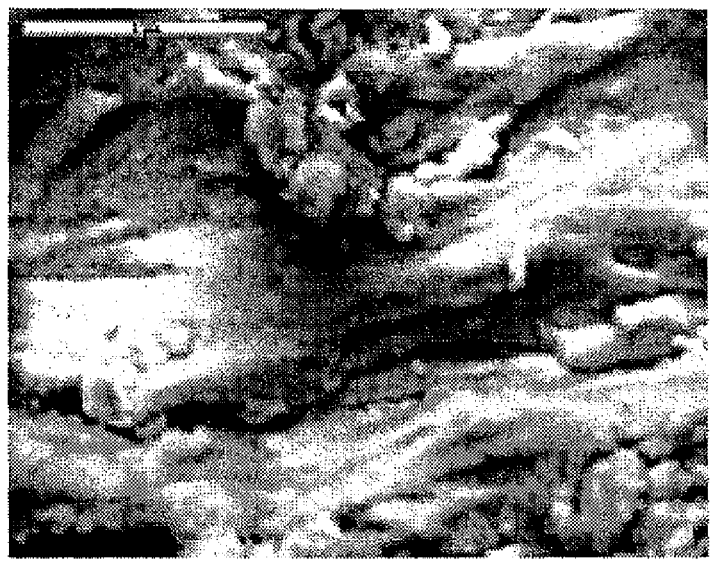
FIG. 3 is a Scanning Electron Microscope image of a polymer ion exchange membrane (PIEM) after "compositing" process in which the PIEM is metallized with a layer of platinum particles concentrated near the surface.
Figure 4:
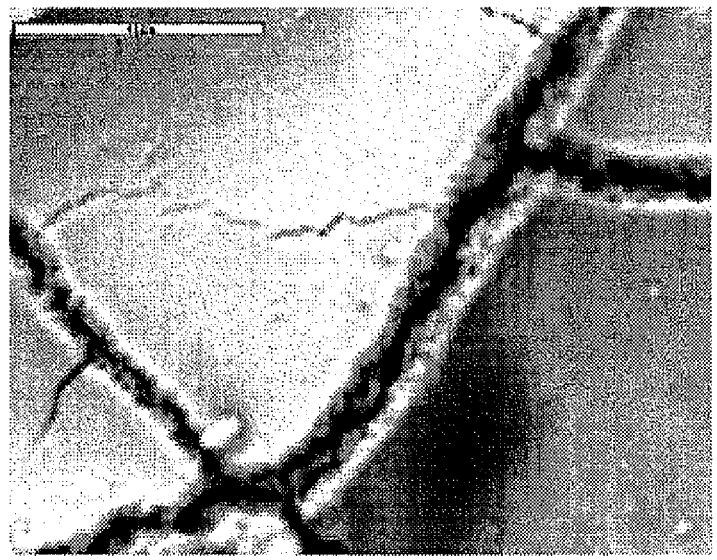
FIG. 4 is a Scanning Electron Microscope image of an IPMC with a platinum surface electrode.

FIG. 3 and FIG. 4 illustrate the surface morphology of an unoptimized IPMC sample before and after the final electrode deposition process, respectively. Use of platinum, the best catalytic material, for the electrodes will permit excellent control of the unactuated surface texture.

In use, the roughness amplitude will be expected to be proportional to the net pressure force on the exposed electrode, and hence to the electric field, via complex mechanisms of surface electrode deformation and subject to the limitation of water electrolysis occurring at ~1.5 V. Further increases in electric field will yield decreasing gains in amplitude and increasing heat generation.

A material sample that is not optimized for this application is predicted to provide a maximum root-mean-square roughness distribution comparable to fine 600-grit sandpaper, or a 16 micron average protuberance diameter.

IPMCs in cantilever configurations typically exhibit low electromechanical conversion efficiencies, of the order of 30%. While the amplitudes of motion in the current application are much smaller and hence the heat generation is expected to be reduced, the thermal cycle due to actuation must also be characterized, as an effective additional input stimulus to the boundary layer. It is believed that this can be achieved using cold-wire anemometry to describe the thermal field in the neighborhood of the IPMC strip.

An additional constraint relates to the need for constant hydration of the PIEM in order to maintain ion mobility within the membrane. Initial laboratory tests indicate that evaporation losses are not important during operation under humidity conditions of the order of 10%, but a procedure to soak the strip in water between experiments to ensure full hydration and repeatable amplitudes of deformation may be important in using such materials.

We now present some examples that describe in greater detail the systems and methods that have been developed.

EXAMPLES

Experiments to evaluate the effectiveness of dynamic roughness as a control authority technique have been completed. Two different polymer candidates were evaluated and a series of baseline wind tunnel tests were performed. In one embodiment, a shape memory polymer was tested to determine its performance characteristics, including a quantification of the scale, type, and activation time of various perturbations. An example of a roughness pattern generated in the polymer was applied to a typical airfoil and tested. It was found that the applied roughness was not optimized for the boundary layer.

The ubiquity of wall bounded flows in aircraft aerodynamics makes them an attractive area for research. Turbulent boundary layers, in particular, are a main focus in practical viscous flow applications. The behavior and characteristics of a turbulent boundary layer often have enormous effects on the global flow around the body. This is especially apparent on lifting surfaces where boundary layer separation may be encountered. By advantageously utilizing the pervasive nature of turbulent boundary layers, novel methods of aircraft control may be developed. It is believed that active micro flow control techniques can offer higher efficiency (in the form of lower aerodynamic penalties for a given goal, or lower energy inputs) and better performance (such as faster, more responsive control), as compared to traditional methods. Additionally, new unconventional aircraft designs may be possible without the constraints of traditional control requirements.

Traditional Flow Control

Traditionally, the control of aircraft has been achieved using various combinations of movable control surfaces. Through the large scale movements of these surfaces, the global flow behavior around an aircraft can be modified. Traditional control surfaces provide relatively consistent and predictable results by imparting large disturbances to the surrounding flow. These large disturbances are strategically utilized to impart moments (and thus control) to an aircraft.

Although there have been variations (V-tail and flying wing aircraft), the use of control surfaces generally require a large empennage structure. Additionally, airfoils are limited in geometry due to the complex structural requirements of movable control surfaces. These necessities result in weight and drag penalties, translating to a reduction in performance and efficiency.

Other large scale flow control techniques, such as vectored thrust nozzles, have more recently been employed. These methods rely on the same principle of global flow control, although in a more drastic manner. While allowing higher performance, these techniques have the same fundamental structural and performance limitations as traditional control surfaces.

Micro Flow Control

A different method of flow control utilizes the receptiveness of turbulent boundary layers to relatively small disturbances. This class of micro flow control includes both passive and active techniques. In contrast to control surfaces, micro flow control relies on imparting small disturbances to the boundary layer in an attempt to influence the global flow around the body.

There are several flow mechanisms that can be explored ranging from the adjustment of turbulent skin friction to control of boundary layer separation. A passive micro flow technique that has been utilized effectively is the vortex generator. Although the geometries of such devices may vary, they are all based on a structure protruding slightly out of the boundary layer. This structure promotes mixing between the free stream and the circulating boundary layer flow, thus increasing boundary layer energy and delaying the onset of separation.

Several active methods have also been explored. Examples of these methods include synthetic jets, heated surfaces, particle seeding, and suction. Although the mechanism utilized in each method may differ, they share a common underlying principle. These methods all rely on injecting energy to the boundary layer, making it more robust to separation. The application of synthetic jets involves an array of pressurized micro-jets (often embedded in the surface of a body) that inject bursts of fluid into the boundary layer. In contrast, suction methods rely on a porous surface in which fluid is extracted from the boundary layer. In both cases, circulation in the boundary layer is increased thus delaying the decay of kinetic energy leading to separation.

Heated surfaces increase the energy in the boundary layer by simply adding a heat flux to the flow. Particle seeding relies on injecting small particles into the boundary layer to encourage mixing between the free stream and circulating regions (much like vortex generators). Although all of these methods have been proven in the lab, only the synthetic jets have proven viable enough to use in practice. In a NASA headed project, a V-22 Osprey tilt rotor aircraft was fitted with a line of synthetic jets to help mitigate sudden boundary layer separation in the vertical lift configuration.

All active methods used thus far have two distinct disadvantages. First, they address only a single, narrow flow regime near separation. Second, they all require complex underlying structures such as plumbing networks and compressors/pumps. These weaknesses may limit the useful extent of these micro control methods.

The systems and methods of the present invention involve boundary layer control using surface modulation, or more specifically dynamic roughness. The major advantage of surface modulation techniques over existing micro flow control methods is that they do not require the same intricate underlying structures and plumbing. This allows the technique to be more readily applied to existing and to near future applications. Successful implementation of this method is expected to provide improved and more efficient flight control. Furthermore, its advantages over traditional control methods may allow unconventional aircraft designs that were impossible before.

Theory

Surface Modulation and Dynamic Roughness

Surface modulation as a micro flow control device allows a wide variety of application techniques. With proper material technologies, a vast number of dynamic boundary conditions can be envisioned, such as continuous, wave like surfaces or arrays of discrete perturbations. In all cases, the overall goal is to trigger a large, global flow change with a relatively small mechanical surface modulation, in the form of dynamic roughness that can be accomplished with a low energy input.

By dynamically roughening the surface, the characteristics of the turbulent boundary layer may be altered. We seek to use this method to impart control authority (that is, the ability to control the fluid dynamic forces on a surface and the resulting motion of an object comprising that surface) through a wide regime, rather than only addressing the flow regime near separation. Control authority can be achieved by applying either detrimental or beneficial effects to the boundary layer. By roughening the surface, it has been empirically shown that skin friction increases and the boundary layer can be driven towards separation. Real world applications of these effects can be observed in cases of aircraft icing as well as observations of the effect of insect covered wing surfaces. While increasing skin friction is a sure method of extracting control authority, it carries a significant penalty in the form of increased overall drag.

In contrast, the strategic addition of roughness to a surface has also been shown to decrease skin friction by driving the boundary layer towards the brink of separation. By driving a boundary layer towards separation, but not allowing it to actually fully separate, the total skin friction on the surface is decreased. This method is more complicated than simply increasing skin friction since a fine balance between avoiding full separation and maintaining lower wall shear stress must be met. This mechanism is the idea behind Stratford's well-known zero skin friction airfoil profile. Stratford demonstrated that a specific airfoil shape resulted in zero skin friction over the foil's adverse pressure region, and thus improved efficiency. However, the nature of the foil required operation within a very narrow flow regime. It is believed that the application of dynamic surface modulation techniques can provide similar behavior over a robust range of flow regimes. Such a dynamic system may require feedback control in implementation, for example by the application of motion sensors operative along as many as three axes and suitable computer control systems comprising general purpose programmable computers and software.

If either mechanism is applied asymmetrically to a body (i.e.; either by application of one effect on one wing, or by application of opposite effects on opposite wings of an aircraft) a control moment (roll, pitch, or yaw) may be achieved.

In order to increase the effectiveness of the application of dynamic roughness, we seek to operate in a flow regime that is most receptive to boundary condition changes, so that the performance of an airfoil changes significantly with relatively small changes in the boundary surface. In the flow regime centered around Reynolds number $Re=10^5$ over two orders of magnitude in performance change is possible.

Material Properties

Important parameters that play a role in determining the utility of a given material for providing a surface that exhibits dynamic roughness include the receptivity of the material to shape and texture perturbations, the energy required to activate the material, and the dynamic response time of the material. It is advantageous to be able to quickly activate (and deactivate) various roughness patterns while consuming as little power as possible. Two types of materials that have been analyzed for this purpose are one or more shape memory plastics produced by Cornerstone Research Group (CRG) of 2750 Indian Ripple Rd., Dayton, Ohio 45440, and an ionic polymer metal composite (IPMC) produced by Environmental Robots, Inc. Some of CRG's current shape memory plastic formulations are based on styrene acrylate, cyanate ester, and epoxy polymer systems.

Shape Memory Polymer

Exotic shape memory metals, such as a nickel-titanium alloy known as Nitinol (originally developed at the United States Naval Ordinance Laboratory and available in various compositions), have long been used for their ability to switch between pliable and rigid states. However, these alloys carry several disadvantages such as a fixed, high activation temperature (hundreds of degrees Celsius), relatively minor deformation (on the order of 10%) and high manufacturing cost.

More recently, shape memory characteristics have been achieved using special blends of polymers. By tailoring different types and amounts of a given polymer component, the activation temperature can be varied. Additionally, the polymers produced can be deformed by several hundred percent while being relatively low cost to produce.

Shape memory polymers achieve their characteristics using varying blends of a copolymer element and a comonomer element. The base copolymer generally comprises crosslinked hard and soft segments (with high and low glass transition temperatures, respectively) and is responsible for switching between and holding rigid crystallized states. The purpose of the comonomer is to adjust the glass transition temperature of the shape memory polymer. When the mixed material is heated to the combined glass transition temperature of the copolymer and comonomer combination, determined by the Fox equation, it becomes pliable. By adjusting the ratio of the comonomer to the copolymer, thereby changing the total glass transition temperature, the final transition temperature of the shape memory polymer can be changed. Furthermore, the amount of deformation and final rigidity of the polymer can be tailored by varying the extent of the comonomer.

Typical shape memory polymers (used primarily in medical suture applications) comprise an oligo (e-caprolactone) dimethacrylate copolymer structure and n-butyl acrylate as the comonomer (due to its low glass transition temperature of −55° C.). We have examined CRG Veriflex®, which is a proprietary blend of styrene acrylate, cyanate ester, and other epoxy polymers. From the material properties of the individual components it can be inferred that the styrene acrylate copolymer composes the base material (the polymer has a typical glass transition temperature of 55 to 65° C.). Cyanate ester is a curable resin with a high (288° C.) transition temperature. Its most likely role is a strengthening component while also allowing the product to be sold as a two part resin system.

According to CRG (see http://www.crgrp.net/veriflex.shtml), the polymer is capable of a 200% deformation at a glass transition temperature of 62° C., while transition temperatures ranging from −30° C. to 260° C. have been observed. In its rigid state, the polymer has a tensile, compressive, and flexural strength of 22.8 MPa, 32.4 MPa, and 31.7 MPa respectively. The thermal conductivity (at 18.9° C.) of the material is stated to be 0.17 W/(m·K). One limitation of current commercially-available shape memory polymers is that they only give a one-way actuation and therefore require a mechanical input to return to the undisturbed configuration.

Ionic Polymer Metal Composite

Various electroactive polymers (EAP) have been employed as electrically controlled actuators, particularly in the study of artificial muscles. EAPs are typically light weight and can deform by a significant amount under relatively low power application.

IPMC samples initially required activation to occur while submersed in a solvent (water). When exposed to air, the effectiveness of the polymer would then drop drastically after a few minutes. However, a coating has been applied to some samples that allows the polymer to activate in air for months. The performance of these polymers still relies on the moisture content in the surrounding air. The IPMC sheets provided by Environmental Robots, Inc. and used by the inventors are Nafion® 117 based and can be activated in air.

Facility and Equipment

Experimental observations were conducted at Caltech's Graduate Aeronautics Laboratory (GALCIT). All data was recorded in the Blue Tunnel facility. The closed loop wind tunnel has a 0.61 m by 0.61 m by 2.1 m test section and is capable of a 50 m/s maximum flow speed. Mean velocity measurements will be conducted with a pitot tube sufficiently far from the test article. The flow temperature is controlled to ensure operation at a consistent Reynolds number regime. The test article is suspended from the roof of the test section with the roof acting as a bounding wall on one tip of the foil (the other tip is free). An optical rotary mount allows the foil to be swept through a range of angles of attack with a resolution of half a degree.

Force and moment data was recorded using a custom 3-component force balance. The balance is aligned such that one force transducer is aligned with the direction of flow (giving a drag force) while two are aligned normal to the free stream (the sum of the two signals gives total lift while the difference is proportional to a pitching moment). The drag transducer has a maximum load of 44.5 N while each lift cell is capable of 222 N (444 N total lift). However, it was found during calibration that the balance begins to display non-linear behavior at total loads greater than 70% of full scale in both drag and lift directions. Raw and calibrated data was recorded using custom acquisition software written in National Instruments' LabView environment. The balance was initially calibrated on a test stand by hanging known weights in the drag and both lift directions. The calibration force was applied at half span (approximate center of force) of a calibration spine with similar dimensions as the test article.

Measurements using Shape Memory Polymer

Cornerstone Research Group offers the tested shape memory polymer as a two part resin system under the trade name Veriflex®. The resin is injected into a closed mold and subject to a heating cycle to fully cure. According to CRG, the resin may be cast into sheets with a maximum thickness of 1.27 cm (with no restriction on minimum thickness). Testing has demonstrated that the effective minimum thickness is 1.6 mm. Curing was inconsistent and resulted in a brittle polymer when thinner sheets were molded.

CRG advises that the polymer should be cured between two sheets of glass (separated by Viton cord) to assure even heating. Since it is difficult to machine glass (to allow molds with different geometries), tests were conducted curing the resin using Teflon and aluminum molds. It was found that Teflon sheets 0.635 mm thick did not have a sufficiently uniform flat surface to allow consistent curing. Additionally, the Teflon molds deformed slightly during the curing process allowing air into the resin. Aluminum molds of the same thickness (0.635 mm) resulted in a cure quality similar to glass molds.

Figure 5:
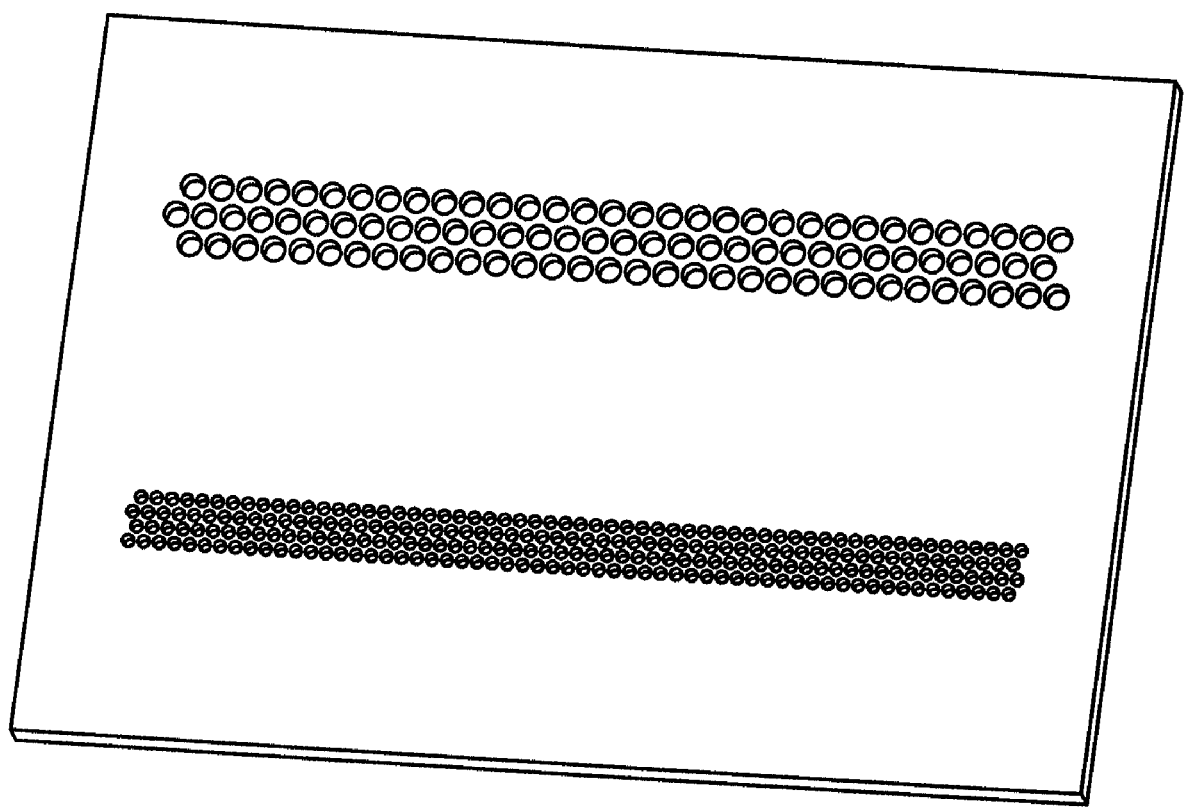
FIG. 5 is an image of an aluminum mold used for generating roughness pattern in shape memory polymer.
Figure 6:
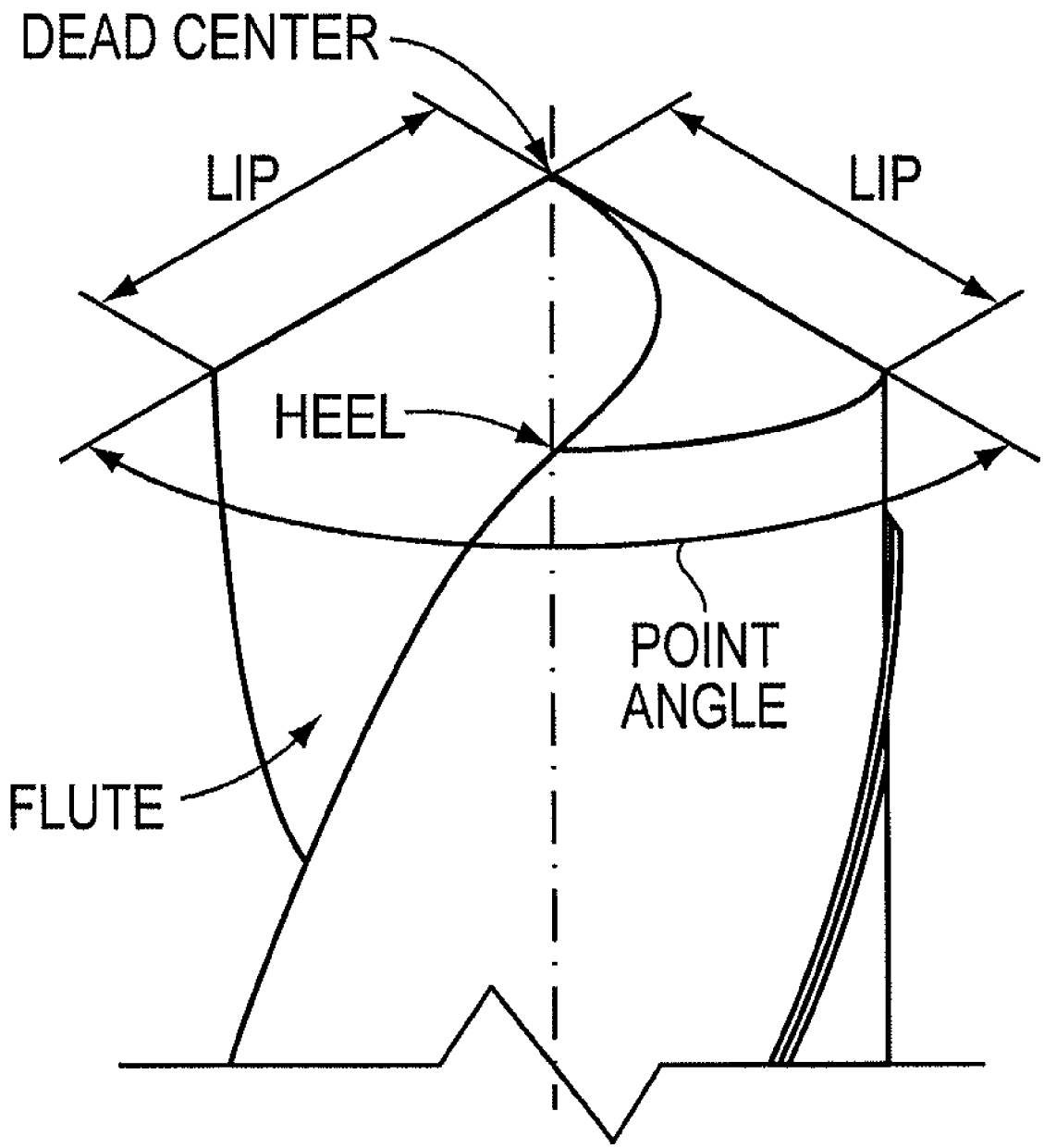
FIG. 6 is a drawing that illustrates standard twist drill bit tip geometry.

To generate embedded roughness patterns, the shape memory polymer was molded using premachined aluminum plates (see FIG. 5). In the first mold, grooved channels (corresponding to ridges in the resulting polymer sheet) of varying depths (see Table 1 below) were machined using a ⅛ inch end mill. The second mold consisted of dimples drilled into the aluminum using standard bits (#54, #44, and #24 bits corresponding to range of bump diameters in Table 1). The dimples were drilled to a depth corresponding to the standard taper at the end of each bit. For each bump diameter, two rows of 10 bumps were machined with the second row laterally offset from the first by half the bump spacing (as given in Table 1). FIG. 5 is an image of an aluminum mold used for generating roughness pattern in shape memory polymer. Two amplitudes shown, both with density $\lambda=0.1$ Due to the method utilized for creating the roughness molds (used to cast shape memory polymer sheets), the exact amplitude is determined by the availability of standard twist drill bit sizes. In order to achieve the desired conical geometry for each roughness bump, only the tapered tip of the bit is used in creating the mold indentations (see FIG. 6). FIG. 6 is a drawing that illustrates standard twist drill bit tip geometry. Since the point angle is defined to be a standard 118°, the necessary bit diameter can be calculated from a desired amplitude. The closest matches to the 1.0 mm and 0.5 mm desired amplitudes correspond to #30 and #51 gauge bits respectively. These bit diameters will yield actual amplitudes of 0.98 mm and 0.51 mm.

In addition to mold material, the curing process also depends on the baking temperature and baking time. CRG recommends curing at 75° C. for 36 hours. It was found during testing that the process is relatively insensitive to excess cure times (up to 48 hours) but higher cure temperatures (above approximately 90° C.) resulted in brittle polymer sheets.

All performance tests, with the exception of dynamic response characterization, were conducted on a hot plate. The plate temperature was set to 80° C. and the polymer samples (with a stated activation temperature of 62° C.) were kept in contact throughout testing. All polymer sheets had a base thickness of 1.59 mm. In tests beginning with a smooth polymer sample (and various roughness patterns pressed in), the roughness mold was held in contact with uniform pressure over the polymer sheet (a weighted glass plate was placed over both) while simultaneously turning off the hot plate to allow the sample to cool and retain the given pattern. In tests beginning with a pre-roughened polymer sample, the perturbations were flattened out by applying uniform pressure over the sheet while simultaneously turning off the hot plate to allow the sample to cool (and retain a smooth configuration). In both cases, the hot plate was turned back on to observe the ability to regain the native configuration.

In testing the dynamic response of the polymer, a sample sheet closely matching the configuration planned for use in wind tunnel testing was utilized. A 3.175 mm thick sheet with 0.71 mm amplitude bumps (see section below) was molded with an embedded 28 awg Nichrome 60 heating wire. The wire has a resistance of approximately 13 ohms/m and is capable of heating to 1200° C. Using a reference table, it was determined that a current on the order of 1 A would be necessary to heat the wire to above the polymer activation temperature (62° C.). A constant current power supply was utilized to heat the sample throughout testing. For the test specimens, a length of 28 awg wire with a resistance of 14 ohms/m was embedded halfway into the rough polymer sheet. The exposed channel under each embedded segment was then filled with a high temperature sealant. Each segment of wire was aligned with a row of roughness bumps to ensure uniform heating. Initial testing indicated that the wire heats to 85° C. at 1.5 A (compared to the polymer transition temperature of 72° C.).

To determine activation times for the polymer sample, the bump pattern was first flattened out by heating the sample and applying uniform pressure (a weighted glass plate was placed over the heated sheet). The power supply was then turned off to allow the sample to cool in the flattened (unactivated) state. All activation times were determined by the time between application of power and time at which 75% of bumps were raised to maximum amplitude.

Airfoil

Figure 7:
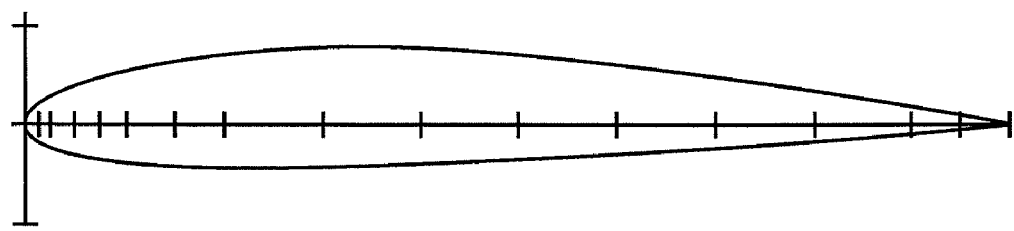
FIG. 7 is a cross sectional diagram that illustrates the profile of the NACA 2412 airfoil.

We performed tests to demonstrate aerodynamic control authority using surface modulation. A two dimensional airfoil shape was chosen as the test article to simplify the analysis of pertinent effects. The NACA 4-series foils are well documented and were considered suitable for representative experiments. The broad use of a particular section, the NACA 2412, in general aviation and UAV designs made it an ideal candidate. FIG. 7 is a cross sectional diagram that illustrates the profile of the NACA 2412 airfoil.

The scale of the test article was limited by the allowable load on the rotary mount as well as force balance. Based on these limitations and given the speed capability of the wind tunnel, a span of 25.4 cm was chosen. The chord of the base test article (without any surface preparation) is 8.9 cm. These dimensions give an aspect ratio of 2.86. One tip of the foil is bounded by the roof of the test section while the other square tip is left free.

Surface Preparation

To allow the modulation of surface roughness, the airfoil test article is layered with a sheet of 0.32 cm thick shape memory polymer. The airfoil backbone (machined out of 6061 aluminum) is first layered with a thin adhesive backed magnet sheet. A matching magnet sheet is applied to a sheet of polymer. The polymer/magnet sheet is then heated and formed around the curved airfoil surface. To allow differing roughness positions, a portion of the low pressure side of the foil is left uncovered, leaving a pocket. A separate strip of polymer with an embedded roughness pattern can then be inserted into this pocket. The rest of the pocket is filled with similarly dimensioned strips of smooth polymer, thus allowing for the discrete repositioning of the rough strip.

Figure 8:
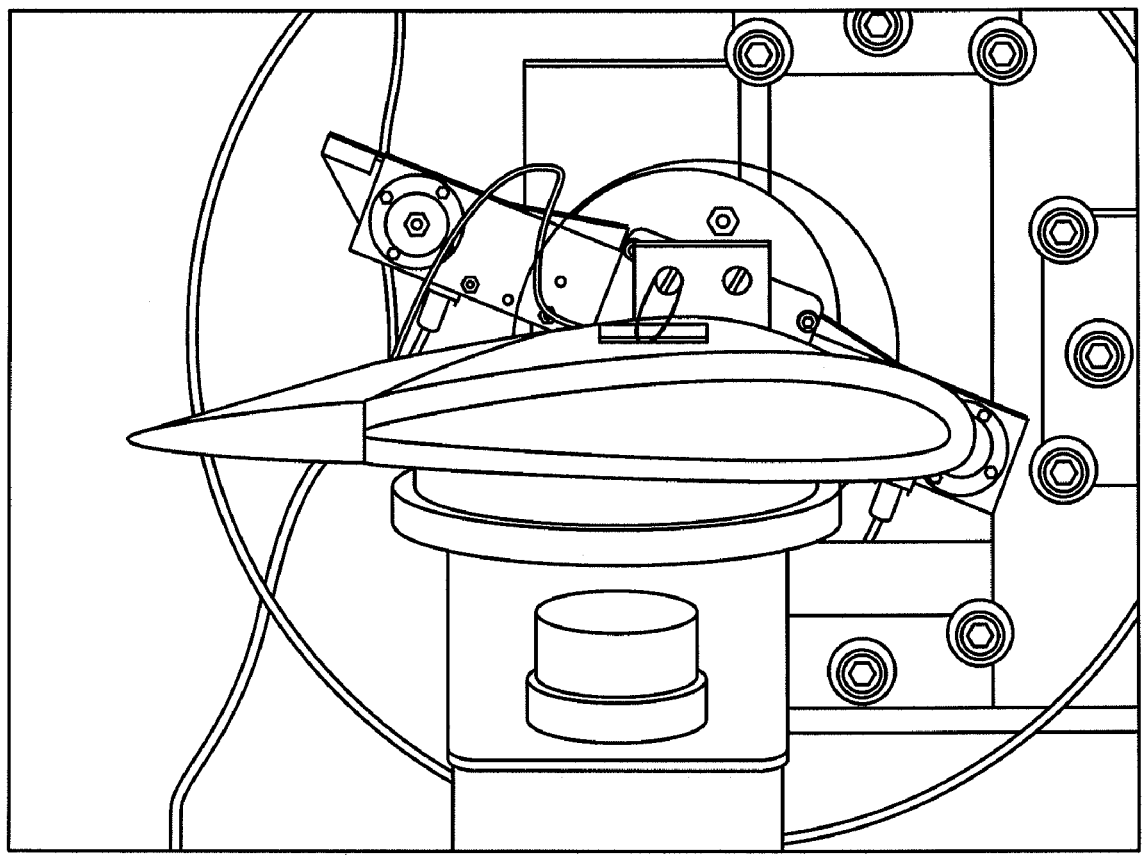
FIG. 8 is an image showing a cross section of a test article showing the applied layers and the slightly modified profile.

FIG. 8 is an image showing a cross section of a test article showing the applied layers and the slightly modified profile. Since the base foil profile was layered over the entire surface, the curvature of the resulting profile differed somewhat from the original NACA 2412 section. Care was taken to maintain a continuous curvature leading to the trailing edge (a trailing edge piece formed out of balsa wood was used). As a result, the leading edge section of the modified profile was blunter and somewhat thicker than the original section. However, since the experiments being conducted here are comparative in nature, it is not critical that the resulting airfoil profile match a standard shape exactly. After all layering and trailing edge modifications, the test article chord grew to 13.17 cm, resulting in an aspect ratio of 1.93. In principle, instead of using a magnetic material to attach the morphable skin to the surface of the airfoil so that relocation of one relative to the other is convenient for experimentation, one could attach the morphable skin using substances such as adhesive or using other fasteners that are configured to hold the morphable skin against the surface of the airfoil as a substrate.

Roughness Amplitude

The experiments were designed to evaluate the effectiveness of small scale perturbations. The roughness amplitudes were chosen based on the turbulent boundary layer thickness. A flat plate approximation was used with the turbulent boundary layer thickness defined empirically by:

$$\delta_{turb}=0.37\times(v/Ux)^{1/5} \quad (3)$$

At half chord (4.445 cm), the predicted thickness is 1.53 mm. Since the roughness pattern was expected to be placed upstream of the of half cord (where the boundary layer is less thick), roughness amplitudes of roughly 1.0 mm and 0.5 mm were evaluated. As will be understood, one can equally perform tests with other operating parameters.

Spacing/Density

The spacing of individual bumps in the roughness pattern was fixed for both amplitudes. To define the bump density, a non-dimensional parameter, $\lambda$, is introduced:

$$\_\lambda=(\text{Exposed Frontal Area})/(\text{Section Plane Area}) \quad (4)$$

Given the conical bump geometry and desired amplitudes, the exposed frontal area can readily be calculated as the area of a triangle (with height given by amplitude and base given by diameter). The two amplitudes used yield areas of 1.60 mm² and 0.43 mm². Typically, a patch is defined as rough if $\lambda \geqq 0.1$. Due to limitations with compressing the shape memory polymer (less spacing between individual bumps may reduce the ability to effectively flatten each one), we seek the sparsest possible roughness density ($\lambda=0.1$). By fixing the roughness parameter, we can calculate the necessary section plane area (defined as the area enclosed by sides connecting neighboring bumps). This yields spacing of 4.0 mm and 2.1 mm (corresponding to 1.0 mm and 0.5 mm amplitude bumps) in both lateral (spanwise) and row (chordwise) directions.

The number of bump rows is defined by the calculated spacing value. Each roughness strip has a chordwise extent of 10% of the total airfoil chord. This allows tests in which the roughness location varies by 10% chordwise increments. FIG. 5 illustrates the roughness spacing of the two desired amplitude bumps, each if which has $\lambda=0.1$.

The locations at which roughness was applied were chosen based on calculated pressure distribution data. As a first estimate, a location where roughness may result in a large global flow change is the point of minimum pressure on the upper surface of the foil. Points further downstream in the region of pressure rise were also evaluated (in 10% chordwise increments up to half chord). Numerical data was calculated using Xfoil code at various angles of attack and Rec=30,000 (corresponding to the maximum expected Rec reachable in the Blue Tunnel). It can be seen that at low angles of attack the minimum pressure point is between 20% and 30% chord. As angle of attack is increased towards stall, the minimum pressure point moves upstream towards the leading edge. Based on limitations with the test article assembly, strips were tested at locations of 28.7%, 35.8%, and 42.9% chord (forward, mid, and aft stations). After layering the base profile with the polymer, considerations to keep the profile as similar to the NACA 2412 as possible limited the possible strip locations.

Experiments were conducted in two phases. In the first phase, the force balance was checked and the operating flow regime was determined. Previously observed data using the same force balance exhibited slight hysteresis at lower angles of attack. An attempt to rule out any inherent hysteresis in the force balance was made by taking baseline data using various methods. First, a baseline sweep was conducted only to a mild α (corresponding to the region of hysteresis observed in previous data, or approximately α=10°) to ensure that possible hysteresis caused by flow separation at higher a is not causing the observed behavior. If necessary, runs will also be taken by varying a in different patterns to try and isolate any peculiar force balance features.

The operating flow regime was then determined. This was done by varying the operating Reynolds number as well as surface preparation (to permit observation of transition characteristics). The intention was to shed light on the separated bubble region as well as the extent of either laminar or turbulent flow.

The second phase of the experiment involved testing the effectiveness of roughness. A round of testing was conducted to evaluate the effect of roughness strips at different locations as well as transient behavior. Data runs were recorded with the roughness strip centered at two different chordwise stations (corresponding to the forward and aft stations mentioned above). Time varying sequences were recorded while the roughness strip was activated. This was performed at certain angles of attack determined to have the greatest receptiveness to roughness application (to be decided after initial runs). To isolate the effect of roughness from heat addition (necessary to activate the shape memory polymer), a smooth sheet of polymer embedded with heating wire was tested. This ensured that any observed phenomena are due to the addition of roughness rather than heat flux effects.

Experimental Results

The shape memory polymer actuation method involved heating the sheet until it attained the activation temperature (62° C.). On the test bench, various methods of heating the polymer can be used ranging from heat gun to hot plate to water bath. However, when placed on the test article in a flow, actuating the polymer becomes more difficult. One method of heating involves laying the polymer sheet over a small coil of heating wire embedded in the test article. This allowed the section of polymer to be heated remotely during the experiment.

The energy needed to activate the polymer can be approximated as the heat input required to raise a sheet of polymer from room temperature (15° C.) to 70° C. Given a typical sheet mass of 10 g and estimating the polymer's heat capacity using a similar hard plastic (polycarbonate) at 1.2 J/(g·K), the necessary heat input is found to be approximately 660 J. If the time required for the polymer to heat to activation temperature is estimated at 30 s, the power necessary to fully activate it is computed to be on the order of 20 W.

Four different roughness forms were tested at varying amplitudes using shape memory polymer. Two of the methods began with a smooth polymer sheet with a roughness pattern added while the other two methods began with a pattern molded in and smoothed over after.

Starting with a smooth sheet, the polymer was receptive to the application of two different forms of roughness. In one test, a fine wire mesh 0.44 mm thick was pressed into a heated sheet of polymer. Measurements indicated that the polymer was able to mold around approximately half the mesh thickness, yielding a roughness amplitude of 0.22 mm. The pattern of the roughness imparted mirrored that of the wire mesh (squares approximately 2 mm a side). It was also found that the polymer was not receptive to roughness scales smaller than half the mesh thickness.

In the second test utilizing a smooth sheet, spherical dimples were pressed into the polymer. It was found that the material was receptive to dimple amplitudes no greater than half the sheet thickness or 0.8 mm. As in the wire mesh case, the minimum amplitude was approximately 0.22 mm. Dimples of larger magnitude may possibly be achieved with a thicker sheet of polymer.

Figure 9:
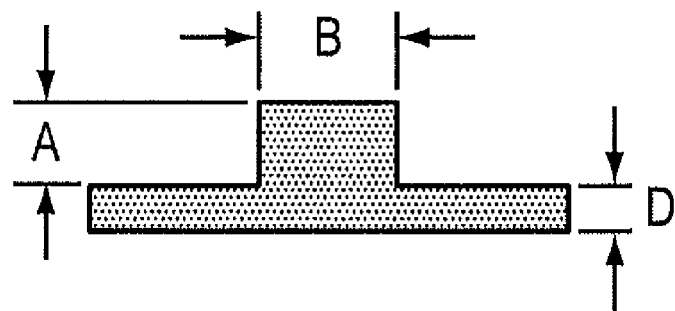
FIG. 9 is a diagram that illustrates the cross section of the ridge asperity.
Figure 10:
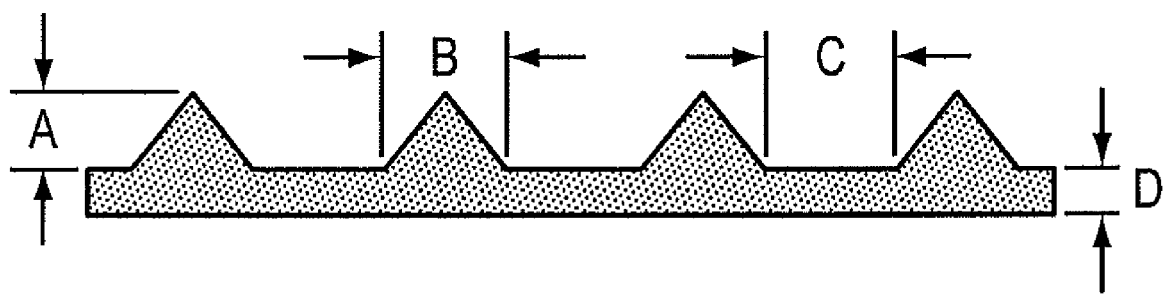
FIG. 10 is a diagram that illustrates the cross section of a plurality of bump asperities.

Two different roughness patterns were molded directly into the polymer in a separate series of tests. One pattern consisted of a single ridge while the second pattern consisted of two rows of circular bumps. The ability to re-smooth the resulting polymer into smooth sheets was evaluated. Table 1 summarizes the two different patterns and various dimensions of each sheet tested. The ridge depth was limited by the tooling size available when machining the molds and can be set to any desired value within reason. FIG. 9 is a diagram that illustrates the cross section of the ridge asperity. FIG. 10 is a diagram that illustrates the cross section of a plurality of bump asperities.

TABLE 1

Roughness Dimensions for Shape Memory Polymer Samples

| Type | Amplitude (A) | Depth (B) | Spacing (C) | Avg. Sheet Thickness (D) |
| --- | --- | --- | --- | --- |
| Ridge (a) | 1.5 mm | 25.4 mm | N/A | 1.4 mm |
| Ridge (a) | 0.48 mm | 25.4 mm | N/A | 1.5 mm |
| Ridge (a) | 0.28 mm | 25.4 mm | N/A | 1.4 mm |
| Bumps (b) | 1.7 mm | 4.57 mm | 7.62 mm | 1.4 mm |
| Bumps (b) | 0.84 mm | 2.79 mm | 5.08 mm | 1.5 mm |
| Bumps (b) | 0.71 mm | 2.10 mm | 2.54 mm | 1.4 mm |

Testing indicated that ridges were very difficult to flatten since the geometry is constrained in the length direction (the sheet must elongate to allow the ridge to flatten). The largest amplitude ridge (1.5 mm) could not be flattened at all while the two smaller amplitude ridges were difficult to smooth over completely. The bumps, however, were very receptive to flattening. While the largest amplitude bumps (1.7 mm) were only able to flatten approximately 77% of the maximum amplitude, the other two bump patterns were relatively easy to smooth over completely. Furthermore, upon a second application of heat the polymer recovered the roughness patterns consistently.

Dynamic Response

Various heating schemes were evaluated to determine the activation time of the sample (using an embedded heating wire). The longest activation time occurred when the sample was heated from room temperature. Starting at 29.2° C. and heating to 75° C. (at 1.5 A), the sample took an average of 104 s to completely activate. In contrast, the fastest possible activation time is achieved when the sample is flattened and allowed to instantly activate by keeping the sheet constantly heated above 62° C. (although this method is impractical for actual experimental use since the test article must be kept in an inactive state for an extended period of time). Keeping the sample heated at 67° C. (at 1.4 A) required an average of 32.3 s to activate. It was found that higher temperatures resulted in faster activation times. With the sample held at 79° C. (at 1.5 A), activation took an average of 15.4 s. Held at 85° C. (at 1.55 A), activation took an average of 12.0 s to activate. Higher temperatures were not tested due to limitations on the available power supply (however, observations using a hot plate demonstrated that temperatures higher than 100° C. have little to no additional benefit in terms of activation time).

In an attempt to minimize activation time while still being able to hold the polymer in an inactive state, the sample can be held at a temperature just below the activation temperature until activation is desired (at which point, the temperature is ramped above the activation temperature). Although the stated activation temperature of the material is 62° C., it was found that slow activation began at temperatures as low as 56° C. Holding the sample at a temperature of 45° C. (at 0.75 A) and ramping up to 80° C. (at 1.5 A) resulted in an activation time of 74.3 s. Holding at an initial temperature of 55 C (at 1 A) and ramping up to 80° C. resulted in an activation time of 40.7 s. This case represents the minimum practical activation time for the given sample sheet. Activation times may vary depending on sheet thickness and perturbation amplitude.

After checking to ensure that the force balance assembly was not exhibiting hysteresis behavior, baseline data was obtained. To determine the general operating regime initially, a survey of the performance of the base test article (un-skinned) was conducted. In all tests, a data point was taken at each angle of attack in an up sweep followed immediately by a down sweep. Each data point is comprised of a time average of 5000 samples at 500 samples/s (for a total of 10 s of averaged data).

After layering the foil with the shape memory polymer, a new series of tests were conducted to establish a baseline for the modified profile. In addition, a control was tested using a smooth polymer strip (of the same dimensions as a rough sample) embedded with the same gauge and length of heating wire. This test was conducted to ensure that any flow changes are due solely to the application of roughness and not the associated heat flux necessary to activate the strip.

Tests were conducted using the 0.98 mm amplitude strip at the forward and aft stations (corresponding to 28.7% and 42.9% chord respectively). A survey of the effect of the fully activated strip was conducted over the range of angles of attack. Additionally, a transient data run was conducted at $\alpha=15°$ with the roughness strip at the forward station. This corresponds to un-stalled in the flattened (baseline) case and stalled in the fully roughened case. In this run, data points are recorded at time intervals of 0.2 s. A moving average of the fluctuating data (as well as the average force value post stall) is superimposed. Note that the roughness pattern began to activate at approximately t=20 s and stabilized at approximately t=80 s (with about 75% of the strip fully activated.

Figure 11:
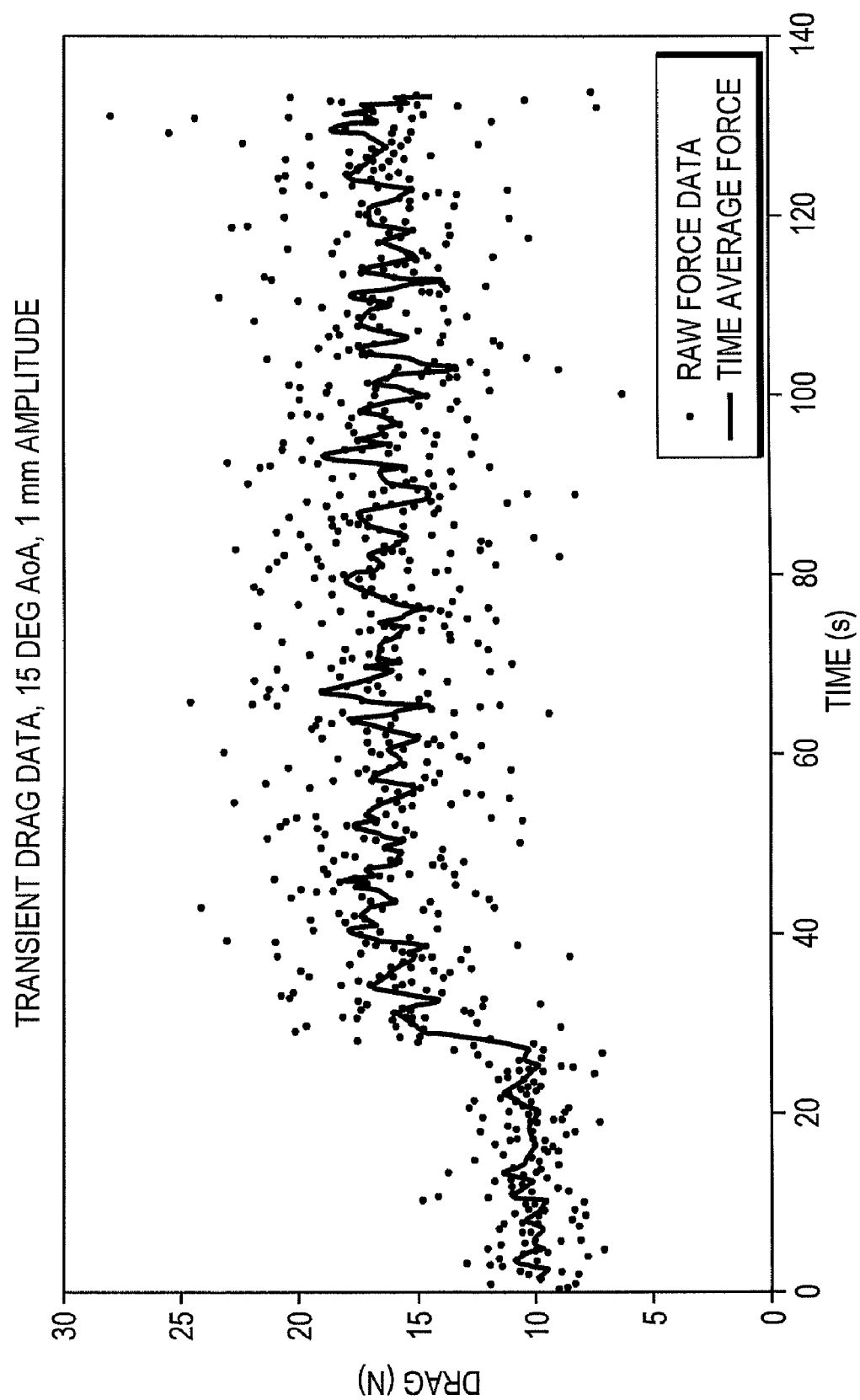
FIG. 11 is a diagram that shows drag vs. time for an angle of attack (AoA) of $\alpha=15°$, with roughness of the order of 1 mm at the forward station.
Figure 12:
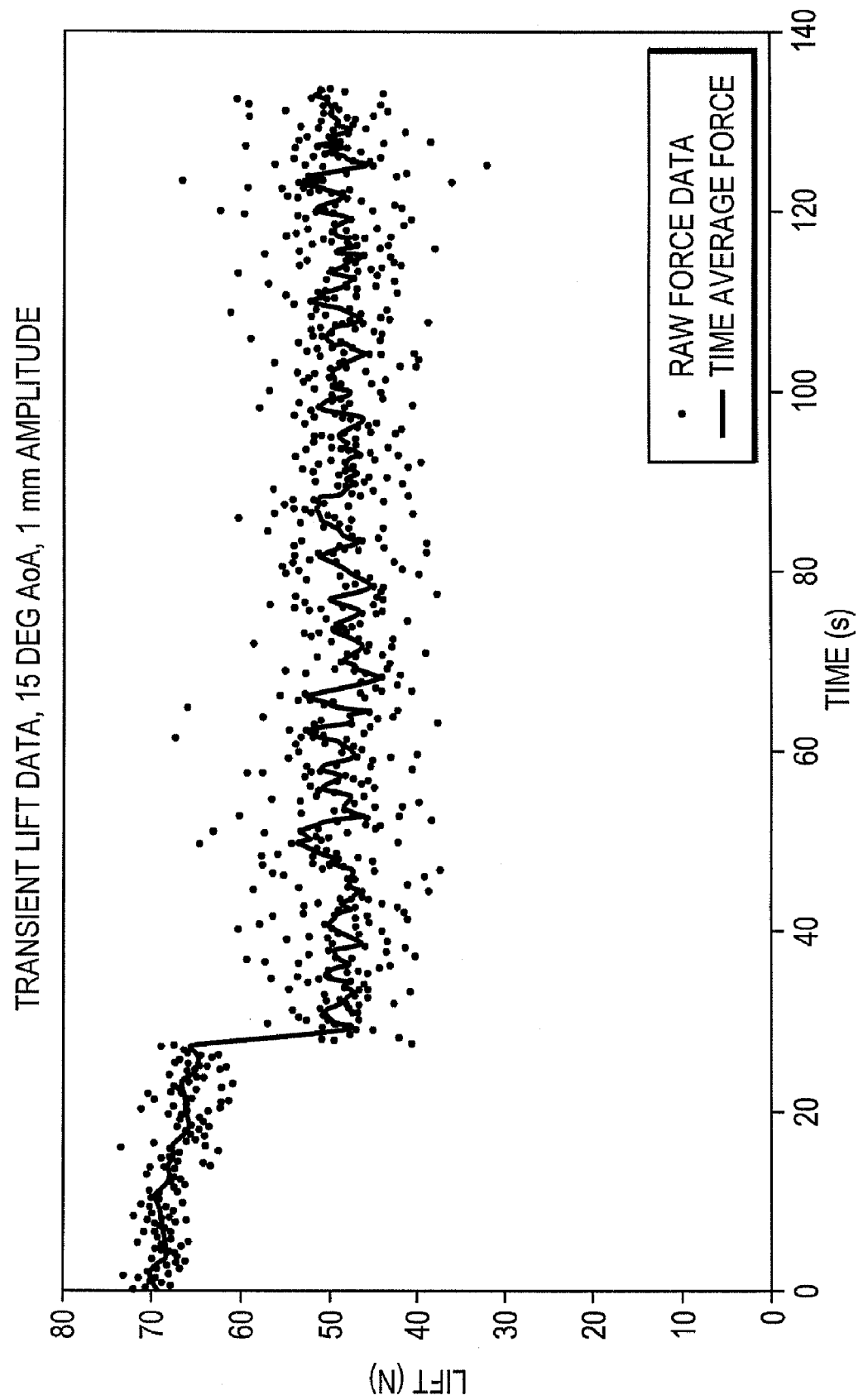
FIG. 12 is a diagram that shows lift vs. time for an angle of attack (AoA) of $\alpha=15°$, with roughness of the order of 1 mm at the forward station.

FIG. 11 is a diagram that shows drag vs. time for an angle of attack (AoA) of $\alpha=15°$, with roughness of the order of 1 mm at the forward station. FIG. 12 is a diagram that shows lift vs. time for an angle of attack (AoA) of $\alpha=15°$, with roughness of the order of 1 mm at the forward station.

Initial baseline data suggests that the current operating regime (at Rec=30,000) is at the cusp of turbulent flow but remains laminar with a large, growing separation bubble. Three main results suggest this behavior. First, data runs using a smooth baseline foil exhibited hysteresis behavior around the stall point ($\alpha=16°$). In general, a large stall hysteresis is indicative of a growing separation bubble. As a is increased, the laminar boundary layer begins to separate but carries enough energy to reattach downstream. As the boundary layer loses energy, the separation region grows until it fully separates at stall. When a is swept back, however, the separation bubble does not exist and lift and drag curves follow a significantly different path when compared to an a upsweep. It should be noted that a separation bubble need not grow until the laminar boundary layer is completely separated from the foil. Another possibility is that enough mixing is introduced that the boundary layer becomes turbulent as the flow becomes reattached. However, this does not appear to be the case as evidenced by the following point. When roughness was introduced to the surface of the foil (empirically shown to induce transition to turbulence), the large hysteresis trend near stall was not observed. In fact, it is questionable whether full separation even occurred since no sharp drop in lift (or increase in drag) was observed. The roughened foils were swept to the same maximum α as the smooth case. This behavior supports the fact that the baseline flow is laminar and that the apparent separation bubbles do not lead to turbulent reattachment. If this were the case, we would expect similar results as the roughened cases since observed separation would be on a turbulent boundary layer. Finally, a data run was taken at a lower flow speed (Rec=10,000). The qualitative behavior of the data at this speed was virtually identical to the higher speed except for a slightly smaller stall hysteresis. This is reasonable given the fact that the lower speed will tend to not support as much bubble growth as the higher speed.

Applying the roughness strips at both the forward and aft stations seemed to have typical effects at low to intermediate angles of attack. This included slight increases in drag and corresponding decreases in lift. Additionally, the onset of full separation was earlier in each of the rough cases, with the strip at the forward station inducing stall the soonest. While a change in the full stall characteristics was observed, other large scale changes due to modifying separation bubble behavior was not readily apparent. This suggests that the operating regime of the test article is not in the predicted Re band in which large scale changes are possible by small influences in the boundary layer. Additionally, the transient data run suggests that, at least at the forward station, the roughness amplitude was over stimulating the boundary layer. Since separation occurred almost immediately after the roughness began to activate, it can be assumed that a very small perturbation is necessary to drastically alter the boundary later at this chord location.

General Purpose Programmable Computers

General purpose programmable computers useful for controlling instrumentation, recording signals and analyzing signals or data according to the present description can be any of a personal computer (PC), a microprocessor based computer, a portable computer, or other type of processing device. The general purpose programmable computer typically comprises a central processing unit, a storage or memory unit that can record and read information and programs using machine-readable storage media, a communication terminal such as a wired communication device or a wireless communication device, an output device such as a display terminal, and an input device such as a keyboard. The display terminal can be a touch screen display, in which case it can function as both a display device and an input device. Different and/or additional input devices can be present such as a pointing device, such as a mouse or a joystick, and different or additional output devices can be present such as an enunciator, for example a speaker, a second display, or a printer. The computer can run any one of a variety of operating systems, such as for example, any one of several versions of Windows, or of MacOS, or of Unix, or of Linux.

In operation, a general purpose programmable computer is programmed with instructions in the form of software or firmware. The instructions control the operation of the general purpose programmable computer/ The general purpose programmable computer can perform a variety of manipulations of data, such as mathematical operations (e.g., calculations), logical operations (e.g., comparisons, or logical deductions following defined rules), and processing of textual or graphical data (e.g., word processing, or image processing). Data can be provided to the general purpose programmable computer as recorded data or as real-time data. The result of any computation or processing operation is recorded in a machine-readable medium or memory for immediate use or for future use. For example, in micro-processor based analysis modules, data can be recorded in a register in a microprocessor, in a cache memory in the microprocessor, in local memory such as semiconductor memory (e.g., SRAM, DRAM, ROM, EPROM), magnetic memory (e.g., floppy disc or hard disc) and/or optical memory (e.g., CD-ROM, DVD, HD-DVD), or in a remote memory such as a central database. Future use of data recorded in a machine-readable medium can include displaying, printing, or otherwise communicating the data to a user, using the data in a further calculation or manipulation, or communicating the data to another computer or computer-based device.

Machine-readable storage media that can be used in the invention include electronic, magnetic and/or optical storage media, such as magnetic floppy disks and hard disks; a DVD drive, a CD drive that in some embodiments can employ DVD disks, any of CD-ROM disks (i.e., read-only optical storage disks), CD-R disks (i.e., write-once, read-many optical storage disks), and CD-RW disks (i.e., rewriteable optical storage disks); and electronic storage media, such as RAM, ROM, EPROM, Compact Flash cards, PCMCIA cards, or alternatively SD or SDIO memory; and the electronic components (e.g., floppy disk drive, DVD drive, CD/CD-R/CD-RW drive, or Compact Flash/PCMCIA/SD adapter) that accommodate and read from and/or write to the storage media. As is known to those of skill in the machine-readable storage media arts, new media and formats for data storage are continually being devised, and any convenient, commercially available storage medium and corresponding read/write device that may become available in the future is likely to be appropriate for use, especially if it provides any of a greater storage capacity, a higher access speed, a smaller size, and a lower cost per bit of stored information. Well known older machine-readable media are also available for use under certain conditions, such as punched paper tape or cards, magnetic recording on tape or wire, optical or magnetic reading of printed characters (e.g., OCR and magnetically encoded symbols) and machine-readable symbols such as one and two dimensional bar codes.

Theoretical Discussion

Although the theoretical description given herein is thought to be correct, the operation of the devices described and claimed herein does not depend upon the accuracy or validity of the theoretical description. That is, later theoretical developments that may explain the observed results on a basis different from the theory presented herein will not detract from the inventions described herein.

While the present invention has been particularly shown and described with reference to the structure and methods disclosed herein and as illustrated in the drawings, it is not confined to the details set forth and this invention is intended to cover any modifications and changes as may come within the scope and spirit of the following claims.

What is claimed is:

1. A vehicle configured to operate using a morphable skin to manipulate viscous boundary layer processes, comprising:
   a vehicle having a surface, said vehicle selected from the group consisting of aircraft;
   a morphable skin having first and second surfaces, said first surface of said morphable skin being attached to at least a portion of said surface of said vehicle, said second surface of said morphable skin comprising asperities, said asperities configured to exhibit a morphable configuration of said second surface relative to said surface of said vehicle;
   an actuator in operative communication with said morphable skin, said actuator configured to apply a control signal to said morphable skin; and
   a controller in communication with said actuator, said controller configured to provide a command to said actuator to control at least one of a speed, a direction and an attitude, said command based at least in part on a deviation of a perceived speed, direction or attitude from a desired speed, direction or attitude;

whereby, in response to a command signal provided to said actuator, said actuator controls said second surface of said skin so that said skin assumes a modified surface configuration relative to said surface of said vehicle so as to control an aerodynamic force to exert a control authority over at least one of said speed, said direction and said attitude of said vehicle.

2. The vehicle of claim 1, wherein said morphable skin comprises an ionic polymer metal composite.

3. The vehicle of claim 1, further comprising electrodes in electrical communication with said morphable skin.

4. The vehicle of claim 3, wherein said control signal is an electrical signal applied to said electrodes.

5. The vehicle of claim 1, wherein said morphable skin comprises a shape memory material.

6. The vehicle of claim 1, wherein said controller comprises an input/output device configured to be operated by a human operator.

7. The vehicle of claim 1, wherein said controller is a programmable computer configured to operate with commands provided by software recorded on a machine-readable medium.

8. The vehicle of claim 1, wherein said modified surface configuration relative to said surface of said vehicle comprises a surface asperity of the order of 1 millimeter.

9. The vehicle of claim 1, wherein said modified surface configuration relative to said surface of said vehicle comprises a surface asperity having a height of the order of 10 percent or less than a boundary layer thickness of a fluid passing over said apparatus.

10. The vehicle of claim 1, wherein said modified surface configuration relative to said surface of said vehicle comprises a surface asperity having a height represented by the relation $m^*\nu/u_\tau$, in which $\nu$ is a fluid kinematic viscosity, $u_\tau$ is a friction velocity equal to a square root of a ratio of wall shear stress $\tau$ to a fluid density $\rho$, and $0<m\leq100$.

11. The vehicle of claim 1, wherein said modified surface configuration relative to said surface of said vehicle has a response frequency of the order of 1 kiloHertz.

12. The vehicle of claim 1, wherein said modified surface configuration relative to said surface of said vehicle has a response frequency of less than the order of the viscous frequency, given by $u_\tau^2/\nu$, in which $\nu$ is a fluid kinematic viscosity, and $u_\tau$ is a friction velocity equal to a square root of a ratio of wall shear stress $\tau$ to a fluid density $\rho$.

13. A method of operating a vehicle, comprising the steps of:
providing a vehicle having a surface, said vehicle selected from the group consisting of aircraft;
providing a morphable skin having first and second surfaces, said first surface of said morphable skin attached to at least a portion of said surface of said vehicle, said second surface of said morphable skin comprising asperities, said asperities configured to exhibit a morphable configuration of said second surface relative to said surface of said vehicle;
providing an actuator in operative communication with said morphable skin, said actuator configured to apply a control signal to said morphable skin;
providing a controller in communication with said actuator, said controller configured to provide a command to said actuator to control at least one of a speed, a direction and an attitude, said command based at least in part on a deviation of a perceived speed, direction or attitude from a desired speed, direction or attitude; and
applying a control signal to said morphable skin from said actuator;
whereby, in response to said control signal, said second surface of said morphable skin is caused to assume a modified surface configuration relative to said surface of said vehicle to exert a control authority over at least one of said speed, said direction and said attitude of said vehicle.

14. The method of operating a vehicle of claim 13, wherein said morphable skin comprises an ionic polymer metal composite.

15. The method of operating a vehicle of claim 13, further comprising the step of providing electrodes in electrical communication with said morphable skin.

16. The method of operating a vehicle of claim 15, wherein said control signal is an electrical signal applied to said electrodes.

17. The method of operating a vehicle of claim 13, wherein said morphable skin comprises a shape memory material.

18. The method of operating a vehicle of claim 13, wherein said controller comprises an input/output device configured to be operated by a human operator.

19. The method of operating a vehicle of claim 13, wherein said controller is a programmable computer configured to operate with commands provided by software recorded on a machine-readable medium.

20. The method of operating a vehicle of claim 13, wherein said modified surface configuration relative to said surface of said vehicle comprises a surface asperity of the order of 1 millimeter.

21. The method of operating a vehicle of claim 13, wherein said modified surface configuration relative to said surface of said vehicle comprises a surface asperity having a height of the order of 10 percent or less than a boundary layer thickness of a fluid passing over said apparatus.

22. The method of operating a vehicle of claim 13, wherein said modified surface configuration relative to said surface of said vehicle comprises a surface asperity having a height represented by the relation $m^*\nu/u_\tau$, in which $\nu$ is a fluid kinematic viscosity, $u_\tau$ is a friction velocity equal to a square root of a ratio of wall shear stress $\tau$ to a fluid density $\rho$, and $0<m\leq100$.

23. The method of operating a vehicle of claim 13, wherein said modified surface configuration relative to said surface of said vehicle is attained in a time of the order of 1 millisecond.

24. The method of operating a vehicle of claim 13, wherein said modified surface configuration relative to said surface of said vehicle has a response frequency of less than the order of the viscous frequency, given by $u_\tau^2/\nu$, in which $\nu$ is a fluid kinematic viscosity, and $u_\tau$ is a friction velocity equal to a square root of a ratio of wall shear stress $\tau$ to a fluid density $\rho$.

25. An object configured to operate using a morphable skin to manipulate viscous boundary layer processes, comprising:
an object having a surface, said object configured to remain stationary while a moving fluid moves past said object;
a morphable skin having first and second surfaces, said first surface of said morphable skin being attached to at least a portion of said surface of said object, said second surface of said morphable skin comprising asperities, said asperities configured to exhibit a morphable configuration of said second surface relative to said surface of said object;
an actuator in operative communication with said morphable skin, said actuator configured to apply a control signal to said morphable skin; and
a controller in communication with said actuator, said controller configured to provide a command to said actuator to control a force applied to said object, said command based at least in part on a deviation of a perceived force applied to said object from a desired force applied to said object;

whereby, in response to a command signal provided to said actuator, said actuator controls said second surface of said skin so that said skin assumes a modified surface configuration relative to said surface of said object so as to control an aerodynamic force applied to said object.

26. The vehicle of claim 1, wherein said surface of said vehicle is a selected one of a surface of an airfoil, a surface of a wing, a surface of an aileron, a surface of an elevator, a surface of a rudder, and a surface of a flap.

27. The method of operating a vehicle of claim 13, wherein said surface of said vehicle is a selected one of a surface of an airfoil, a surface of a wing, a surface of an aileron, a surface of an elevator, a surface of a rudder, and a surface of a flap.

* * * * *